United States Patent
Bolan et al.

(10) Patent No.: US 7,779,276 B2
(45) Date of Patent: Aug. 17, 2010

(54) POWER MANAGEMENT IN A POWER-CONSTRAINED PROCESSING SYSTEM

(75) Inventors: Joseph Edward Bolan, Cary, NC (US); Keith Manders Campbell, Cary, NC (US); Vijay Kumar, Cary, NC (US); Malcolm Scott Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 11/681,818

(22) Filed: Mar. 5, 2007

(65) Prior Publication Data
US 2008/0222435 A1    Sep. 11, 2008

(51) Int. Cl.
G06F 1/00 (2006.01)
G06F 1/32 (2006.01)
G06F 15/177 (2006.01)
G06F 15/76 (2006.01)

(52) U.S. Cl. .................. 713/300; 713/320; 709/220; 712/13

(58) Field of Classification Search .......... 713/300, 713/320; 709/220; 712/13, 12
See application file for complete search history.

(56) References Cited

U.S. PATENT DOCUMENTS

| | | | |
|---|---|---|---|
| 5,719,800 A | 2/1998 | Mittal et al. | |
| 6,564,328 B1 | 5/2003 | Grochowski et al. | |
| 6,931,559 B2 | 8/2005 | Burns et al. | |
| 7,032,119 B2 | 4/2006 | Fung | |
| 7,281,146 B2 * | 10/2007 | Nalawadi et al. | 713/320 |
| 7,400,062 B2 * | 7/2008 | Pincu et al. | 307/29 |
| 7,562,234 B2 * | 7/2009 | Conroy et al. | 713/300 |
| 7,607,030 B2 * | 10/2009 | Goodrum et al. | 713/300 |
| 2004/0003303 A1 | 1/2004 | Oehler et al. | |
| 2004/0163001 A1 | 8/2004 | Bodas | |
| 2005/0015632 A1 | 1/2005 | Chheda et al. | |
| 2005/0102544 A1 | 5/2005 | Brewer et al. | |
| 2005/0283624 A1 | 12/2005 | Kumar et al. | |
| 2005/0289362 A1 | 12/2005 | Merkin et al. | |
| 2006/0161794 A1 | 7/2006 | Chiasson et al. | |

OTHER PUBLICATIONS

PCT International Application No. PCT/EP2008/052319 "International Search Report and Written Opinion", dated Oct. 2, 2008, 9 pages.

* cited by examiner

*Primary Examiner*—Stefan Stoynov
(74) *Attorney, Agent, or Firm*—Cynthia G. Seal; Jeffrey L. Streets

(57) ABSTRACT

Systems and methods are provided for managing power in a processing system. In one embodiment, a target system having a plurality of electronic devices is operated within a net power limit. A local controller detects power consumption for each device, and communicates the power consumption to a power management module. The power management module dynamically apportions the net power limit among the devices, and communicates the apportioned power limit for each device back to the associated local controller. Each local controller enforces the apportioned power limit to an associated device on behalf of the power management module.

18 Claims, 5 Drawing Sheets

POWER MANAGEMENT IN A POWER-CONSTRAINED PROCESSING SYSTEM

BACKGROUND OF THE INVENTION

1. Field of the Invention

The present invention relates to power management in a computer system having multiple devices, such as in a rack-based server system or data center.

2. Description of the Related Art

Multiple servers and other computer hardware are often consolidated into a centralized data center. Servers in a data center may be mounted in a rack to conserve space and place the servers and infrastructure within easy reach of an administrator. The IBM eServer BLADECENTER is one example of a compact server arrangement (IBM and BLADECENTER are registered trademarks of International Business Machines Corporation, Armonk, N.Y.).

When multiple servers and other computing hardware are consolidated, power to the servers must be carefully monitored and controlled. Power consumption affects many aspects of operating a data center, such as the costs of operating the servers, the heat generated by the servers, and the performance and efficiency of the system. The individual servers and the system as a whole are limited by design parameters such as maximum power consumption, maximum operating temperature, processing efficiency, and so forth. Thus, it is important to control power to the system in consideration of these parameters.

Existing processing systems may be powered by a common power supply or power distribution unit (PDU). Some of the systems include a circuit, such as a Baseboard Management Controller (BMC), that a service processor uses to monitor real-time power consumption by a server. Using this feedback, the service processor can "throttle" the processors and/or memory on the server to maintain the power consumption below a set point or "power ceiling" set by an administrator and monitored by the chassis management module. U.S. Pat. No. 7,155,623 to IBM discloses a "Method and System for Power Management Including Local Bounding of Device Group Power Consumption." U.S. Patent Application Publication No. US 2006/0156042 to IBM discloses a "Method, System, and Calibration Technique for Power Measurement and Management Over Multiple Time Frames."

Improved ways of managing power are needed to accommodate the increasing demands placed on server systems. It would be desirable to improve the power handling capabilities of server systems, so that increasingly powerful and dense systems would continue to be reliably operated within the constraints of available power. Furthermore, it would be desirable to operate server systems in manner that that does not unduly restrict operations within the capacity of the system.

SUMMARY OF THE INVENTION

In a first embodiment, a method of managing power in a processing system is provided. A net power limit is provided to a plurality of devices within the processing system. Power consumption of each device is detected. The net power limit is dynamically apportioned among the plurality of devices according to each device's detected power consumption. Each apportioned power limit is communicated to an associated one of a plurality of local controllers. Each local controller is coupled to an associated one of the plurality of devices. Each local controller is used to limit the amount of power to the associated device within the apportioned power limit of that local controller.

In a second embodiment, a computer program product is provided, comprising a computer usable medium including computer usable program code for managing power in a computer system. The computer program product includes computer usable program code for providing a net power limit to a plurality of devices within the processing system, for detecting power consumption for each of the plurality of devices, for dynamically apportioning the net power limit among the plurality of devices according to their detected power consumption, for communicating each apportioned power limit to an associated one of a plurality of local controllers each coupled to an associated one of the plurality of devices, and for powering the associated device within the apportioned power limit of that local controller.

In a third embodiment, a power-controlled processing system is provided, including a plurality of electronic devices. A shared power supply is coupled to the devices for supplying power to the devices. Each of a plurality of local controllers is coupled to an associated one of the electronic devices for detecting power consumption of the associated electronic device, outputting power consumption signals representative of the detected power consumption, and selectively controlling power to the associated device within an apportioned power limit. A power management module is in electronic communication with the plurality of local controllers for receiving the power consumption signals, apportioning a net power limit according to the detected power consumption, and communicating each apportioned power limit to the local controller of the associated electronic device.

Other embodiments, aspects, and advantages of the invention will be apparent from the following description and the appended claims.

DETAILED DESCRIPTION OF PREFERRED EMBODIMENTS

Figure 1:
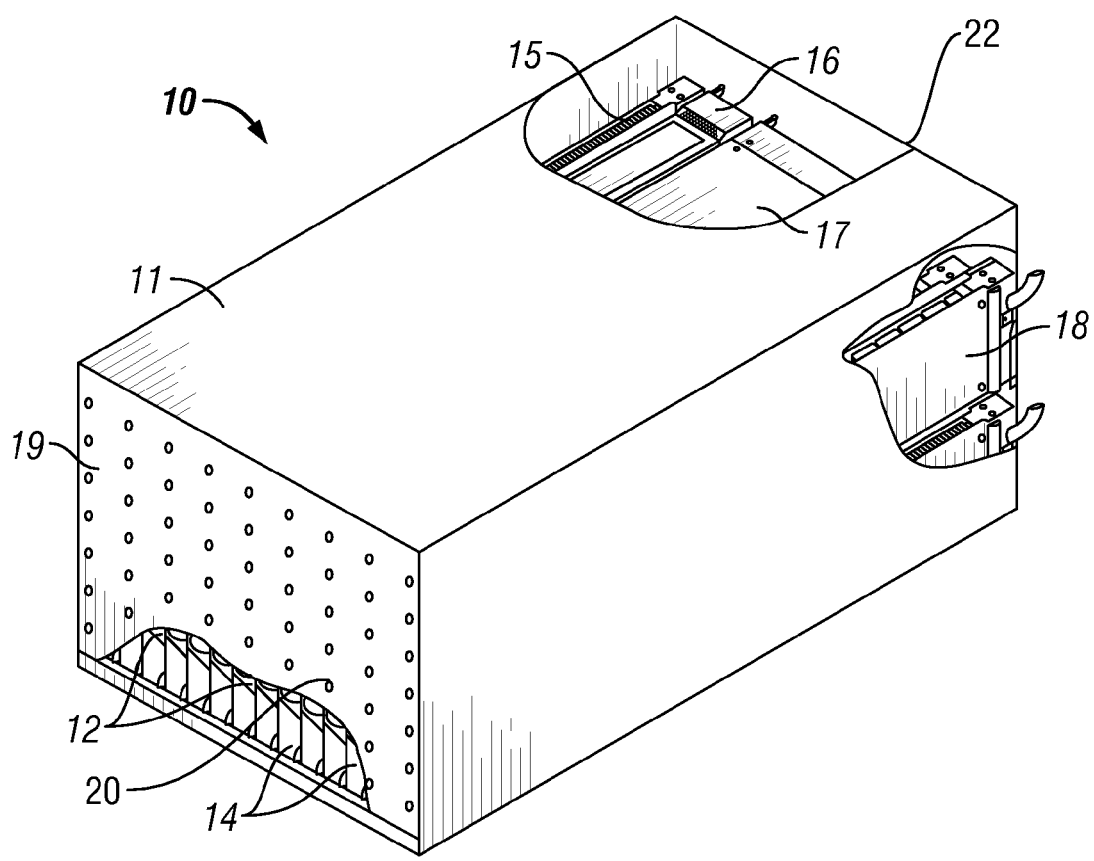
FIG. 1 is a perspective view of a rack-based server system to which power may be managed according to the invention.

The present invention provides improved systems and methods for managing power in a processing system having multiple components or devices, such as in a multi-server computer system. Embodiments of the invention are particularly suitable for management of power in rack-based computer system, such as blade server systems and in data centers. The invention includes methods for budgeting the use of power from a limited power supply by detecting the power consumption of multiple devices (e.g. servers) in a processing system, and dynamically apportioning a net power limit among the devices according to their detected power consumption. This provides each device with power according to the needs of that device at any given moment, while maintaining net power consumption within a net power limit. Benefits of managing power according to the invention include increased efficiency, along with an associated reduction in operation costs, heat production, and noise.

According to one embodiment, a method of managing power in a processing system is provided. A "target system" is selected for which power is to be managed. The target system may be, for example, an entire datacenter, one or more rack-based server systems in a datacenter, or a subsystem thereof. The target system includes a plurality of "devices" powered by a shared power supply. For example, in a rack-based server system having a plurality of servers, blowers, switches, power supplies, and other support modules, the selected target system may be the plurality of servers. A global ("net") power limit is selected for the target system. The net power limit may be selected by a system designer, a system operator (user), or by hardware and/or software. The net power limit may be imposed, for example, to limit operating costs, heat, or sound levels generated by the target system. The net power limit is apportioned among the devices of the target system according to their respective power consumption.

According to another embodiment, a power-regulated processing system is provided. A power management module (MM) apportions a net power limit among the devices of a target system. Each device may include an associated "local controller" for monitoring and controlling power to the device. The power management module and the local controllers may work in tandem to control the distribution of power to the servers according to the needs of the servers, as may be determined according to the real-time power consumption of the servers. The local controller typically includes a precision measurement and feedback control system that may be implemented, for example, using a hard, real-time function running on the BMC. Each local controller communicates information regarding the power consumption of its associated device to the management module. The management module apportions the net power limit among the devices according to their present power consumption and communicates the apportioned power limits to the local controllers. The local controller enforces the apportioned power limits on behalf of the MM. Thus, net power to the target system is maintained within the net power limit, while power to each device is individually maintained within its dynamically apportioned power limit. Typically, the management module will determine which device(s) have excess allocated power, and the associated local controllers (at the direction of the MM) would reclaim an excess portion of the allocated power before redistributing that reclaimed power among the devices. In other embodiments, however, power limits may be reclaimed from the device(s) having excess power margins and substantially simultaneously redistributed among the devices without substantially exceeding the net power limit at any instant.

Under usual operating conditions, the net power limit may be sufficient to dynamically apportion each device a power limit in excess of its power consumption. This results in a positive "power margin" or "overhead," which is the difference between a device's apportioned power limit and its power consumption. Because the amount of power consumed by each device is typically dynamic, the apportioned power limit for each device is also dynamic. One approach that may be implemented is to provide each device with at least a selected minimum power margin. Typically, the net power limit is evenly apportioned among the devices of the target system in such a way that every device has about the same power margin at any given moment. If the circumstance arises that the net power consumption of the target system exceeds the net power limit, the MM may respond by lowering the net power limit, to effectively impose a "negative" power margin or overhead on some or all of the devices of the target system, wherein the apportioned power limit for the devices is less than the power consumption detected prior to the imposition of the negative overhead. The BMC may respond to the imposition of negative overhead in such a contingency by throttling the servers and/or memory to reduce the power consumption of each device to within its apportioned power limit.

The invention may be applied to a rack-based server system environment. FIG. 1 is a perspective view of a rack-based server system ("computer system") 10 to which power may be managed according to the invention. The computer system 10 includes an enclosure 11 with an optional grillwork 19. The enclosure 11 houses a plurality of system devices, including a plurality of servers 12. Each server 12 is typically one node of the computer system 10. Generally, a node is a device connected as part of a computer network. A node may include not only servers, but other devices of a computer system, such as a router or a memory module.

Each server 12 may include one or more processors. A processor typically includes one or more microchip, which may be a "CPU," and which is a device in a digital computer that interprets instructions and processes data contained in computer programs. The servers 12 may also include hard drives and memory to service one or more common or independent networks. The servers 12 are shown as "blade" type servers, although the invention is also useful with other types of rack-mounted server systems, as well as other types of computer systems and electronic equipment. Numerous other electronic devices are typically housed within the enclosure 11, such as a power management module 15, a power supply module 16, at least one blower 17, and a switch module 18. The multiple servers 12 may share the power management module 15, power supply module 16, blower 17, switch module 18, and other support modules. Connectors couple the servers 12 with the support modules to reduce wiring requirements and facilitate installation and removal of the servers 12. For instance, each server 12 may couple with a gigabit Ethernet network via the switch module 18. The enclosure 11 may couple the servers 12 to the Ethernet network without connecting individual cables directly to each server. Multiple rack server systems like the computer system 10 are often grouped together in a data center.

The servers 12 and other devices generate heat within the computer system 10. In particular, each server 12 consumes power and produces heat, which may be a function of numerous factors, such as the amount of load placed on its processor(s) ("processor load"). Processor load generally relates to computational throughput, and is typically tied to factors such as processor speed, clock speed, bus speed, the number of individual processors recruited for performing a task, and so forth. Thus, processor performance metrics such as MIPS ("million instructions per second") or teraflops may be used to describe processor load. The amount of processor load may also be characterized in terms of a processor's maximum processing capacity, such as "percentage of full processor utilization." The percent utilization of a group of processors may be expressed in terms of the combined processing capacity of the multiple processors. For example, at an instant in time, a hypothetical three-processor server may have a first processor operating at 33%, a second processor operating at 50%, and a third processor operating at 67%, with an overall/average processor utilization for the server of 50%. The load on processors is typically dynamic, so the percent utilization, itself, may be expressed instantaneously or as an average utilization over time.

Techniques for reducing power consumption include selectively "throttling" the processor(s), placing subsystems into power-saving modes of operation, or powering off unused circuitry. Other examples of reducing processor load are reducing a clock frequency or operating voltage of one or more of the CPUs, or introducing wait or hold states into the activity of the CPUs. Thus, both net processor load and individual processor load may be controlled. Although there may be some correlation between processor load and power consumption in a given system, power consumption is not a well-defined function of processor load. There are many cases where power consumption may be completely different when processor load appears to be 100%, for example. This is because of the behaviors of the underlying microarchitectures, transistor variability on a per-chip basis, and many other complex factors that affect power consumption.

Figure 2:
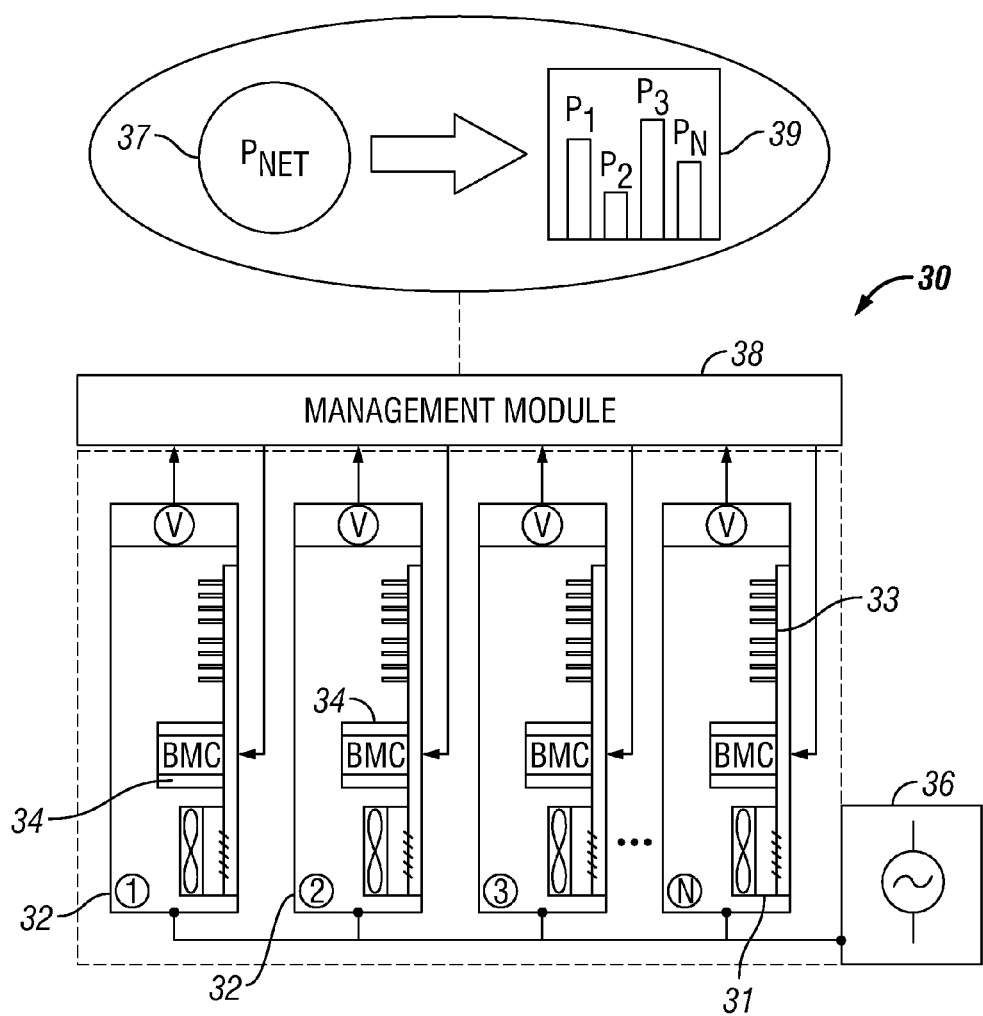
FIG. 2 is a schematic diagram of a representative embodiment of a power-managed target system according to the invention, in the context of a multi-server computer system.

FIG. 2 is a schematic diagram of a representative embodiment of a power-managed target system 30 according to the invention, in the context of a multi-server computer system. The target system 30 includes a number "N" of servers 32. Each server 32 includes one or more processors or CPUs 31 and memory 33. The memory 33 may be, for example, a four slot-per-channel 533 MHz DDR2. A power supply 36 supplies power to the target system 30 and is shared among the servers 32. A suitable power supply is not limited to a single, unitary power module. For example, the power supply 36 may comprise multiple power modules, which, collectively, supply all the power needed by the target system. Each server 32 also includes an associated local controller 34 for monitoring and controlling power to the server 32. The local controller typically includes a precision measurement and feedback control system that may be implemented, for example, using a hard, real-time function running on a BMC. Each local controller 34 may control power to its associated server 32. For example, the local controller 34 may dynamically throttle or adjust its processor(s) 31 and/or its memory 33. The local controllers 34, by virtue of the BMC, are capable of adjusting power on a millisecond time scale, as a hard, real-time proportional control system.

A power management module 38 is provided for apportioning a net power limit ($P_{NET}$) 37 among the servers 32. The apportionment of power is illustrated in the figure by a representative, dynamic power distribution 39, wherein each server 32 is allocated an individual power limit labeled in the figure as $P_1$ through $P_N$. The power management module 38 works in tandem with the local controllers 34 to control the distribution of power from the shared power supply 36 to the servers 32 according to their needs, as may be determined from the real-time power consumption of the servers 32. Each local controller 34 communicates information regarding the power consumption of its associated device 32 to the management module 38. The management module 38, in turn, apportions the net power limit among the servers 32 considering their power consumption and communicates the apportioned power limits to the local controllers 34. The local controllers 34 enforce the apportioned power limits for each of their associated servers 32 on behalf of the power management module 38. Typically, the management module 38 will determine which server(s) 32 have excess allocated power, and the associated local controllers 34 (at the direction of the power management module 38) are instructed by the management module to reclaim an excess portion of the allocated power before the management module can begin redistributing it among the devices. Thus, net power to the target system 30 is maintained within the net power limit 37, while power to each server 32 is individually maintained within its apportioned power limit $P_N$.

The power management module 38, working in tandem with the local controllers 34, efficiently budgets power within the net power limit 37. Rather than inefficiently and arbitrarily providing equal power limits to each server 32, power is dynamically apportioned to the servers 32 according to their real-time power consumption. Thus, for example, available power may be re-allocated from lesser-demanding servers to higher-demanding servers, while maintaining net power consumption of the target system 30 within the net power limit 37. The power management module 38 dynamically apportions power to the servers 32 so that power caps imposed by the local controllers 34 on their associated servers 32 are assured on a millisecond timescale, to prevent overcurrent trips on power supplies that would otherwise bring down the entire group of servers 32.

Figure 3:
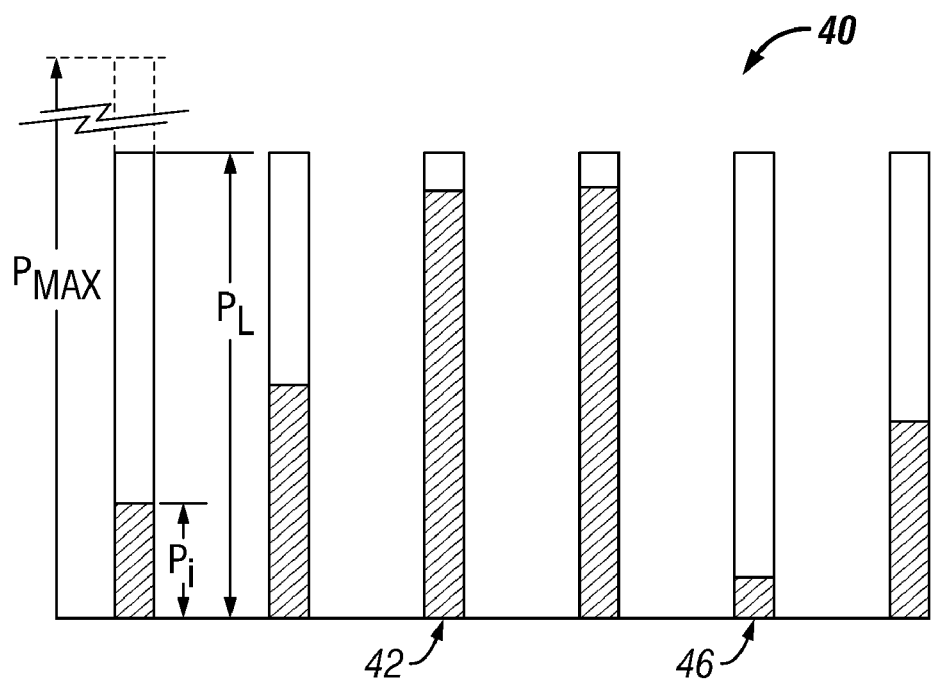
FIG. 3 is a bar graph illustrating a non-ideal distribution of power to the target system of FIG. 2 at an instant in time.

FIG. 3 is a bar graph 40 graphically illustrating a simplified, hypothetical distribution of power to the target system 30 of FIG. 2 at an instant in time. In this example, the target system 30 includes six of the servers 32 (N=6), whose loading parameters at the instant in time are represented by six vertical bars. Each server 32 has a maximum power capacity ($P_{MAX}$), which may vary from server to server. For the purpose of this example, a net power limit is assumed to be evenly distributed among the servers 32 at the instant in time, providing each server 32 with substantially the same power limit $P_L$ ($P_L < P_{MAX}$). This equal allocation of available power is illustrated graphically by vertical bars of equal height. Each local controller 34 maintains power consumption $P_i$ (the shaded portion of the six vertical bars) of its associated server 32 within its individual power limit $P_L$, such that $P_i < P_L$. The power consumption may be monitored in terms of instantaneous value of $P_i$, a time-averaged value of $P_i$ over a prescribed time interval, and/or a peak value of $P_i$. Time-averaged values of $P_i$ may be computed for time intervals of between about 1 millisecond and 2 seconds.

The instantaneous distribution of power described in FIG. 3 is not ideal, and in most cases can be avoided by implementing the invention. All of the servers in the loading of FIG. 3 have the same power limit $P_L$, despite the fact that each server is consuming a different amount of power at the instant in time. For example, the server represented by vertical bar 46 is consuming comparatively little power ($P_i$), while the server represented by vertical bar 42 is consuming a large amount of power in comparison, but they each have the same $P_L$. The invention may rectify this inefficient allocation of the net power limit by dynamically apportioning the net power limit $P_{NET}$ among the servers. The method may be used, for example, to redistribute power limits among the servers according to their detected power consumption. By dynamically apportioning the net power limit on a sufficiently small time scale, such as on the order of milliseconds, the servers may be continuously provided with substantially equal overheads, for example, without exceeding the net power limit. Typically, power would first be reclaimed from the device(s) that have excess allocated power, before the net power limit is redistributed among the devices. This may more reliably avoid briefly or instantaneously exceeding the net power limit during the step of redistributing the net power limit. In some systems, however, power may be reclaimed from the device(s) having excess power and substantially simultaneously redistributed among the devices with sufficient reliability to not exceed the net power limit at any instant.

Figure 4:
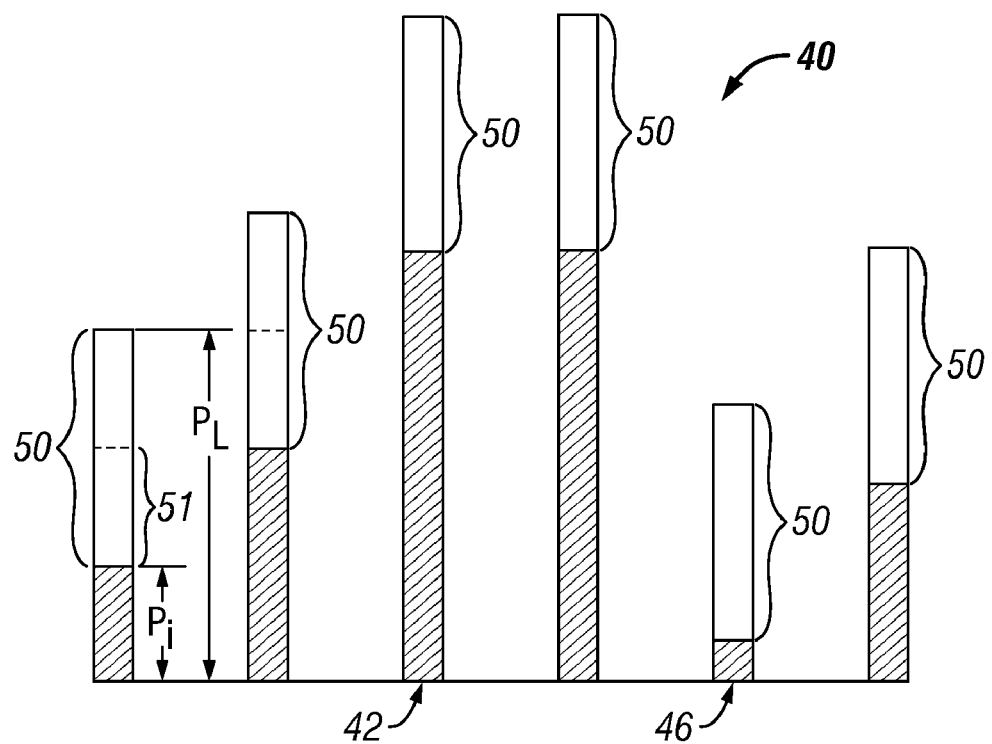
FIG. 4 is a bar graph illustrating a more suitable apportionment of available power in the six-server target system for the instantaneous loading in FIG. 3.

FIG. 4 is a bar graph illustrating a more suitable apportionment of available power in the six-server target system for the instantaneous loading in FIG. 3. The net power limit $P_{NET}$ and the individual power consumption $P_i$ of the servers 32 is the same as in FIG. 3. However, the net power limit $P_{NET}$ has been apportioned among the servers according to the invention, to provide each server with substantially the same overhead ("power margin") 50. Thus, the power limit $P_L$ for the server 46 has been reduced, while the power limit $P_L$ for the server 42 has been increased, giving the servers 42, 46 substantially equal overheads 50. The power consumption $P_i$ for each server is typically dynamic, changing over time. Therefore, the net power limit may be dynamically apportioned among the servers to account for the dynamic power consumption $P_i$. The increased power limit $P_L$ for server 42 allows the server to handle greater processing loads before the local controller would need to take action toward limiting the load.

A number of "trigger conditions" may optionally be selected to trigger an apportionment of power limits in a target system. Still referring to FIG. 4, one optional trigger condition may be when the power margin for one or more server is less than a selected minimum power margin 51. A system may retain the apportionment of power shown in FIG. 4 until the power consumption $P_i$ of one or more of the servers increases to a level at which the power margin 50 is less than the selected minimum power margin 51. This example of a trigger condition is dependent on power consumption $P_i$.

Power limits may alternatively be regularly apportioned at selected time intervals. Thus, the passage of a selected time interval is another example of a trigger condition that may be chosen for triggering the apportionment of the net power limit. The time interval may be a precise function of the power distribution hierarchy in a target system and the power conversion devices at each level of that hierarchy. For a fuse on a line cord, the response time to stay within a power limit is measured in intervals of between 100s of milliseconds up to about 2 seconds, depending on the rating of the fuse. A line cord feeds bulk power supplies for servers. The bulk power supply has an overcurrent level that is typically specified on the order of a few 10s of milliseconds. For example, a BC-1 power supply may shut down after, e.g., 20 ms of overcurrent. The voltage regulator modules (VRM), which are powered by the bulk power supply, can enter overcurrent scenarios on the order of single-millisecond time scales.

Figure 5:
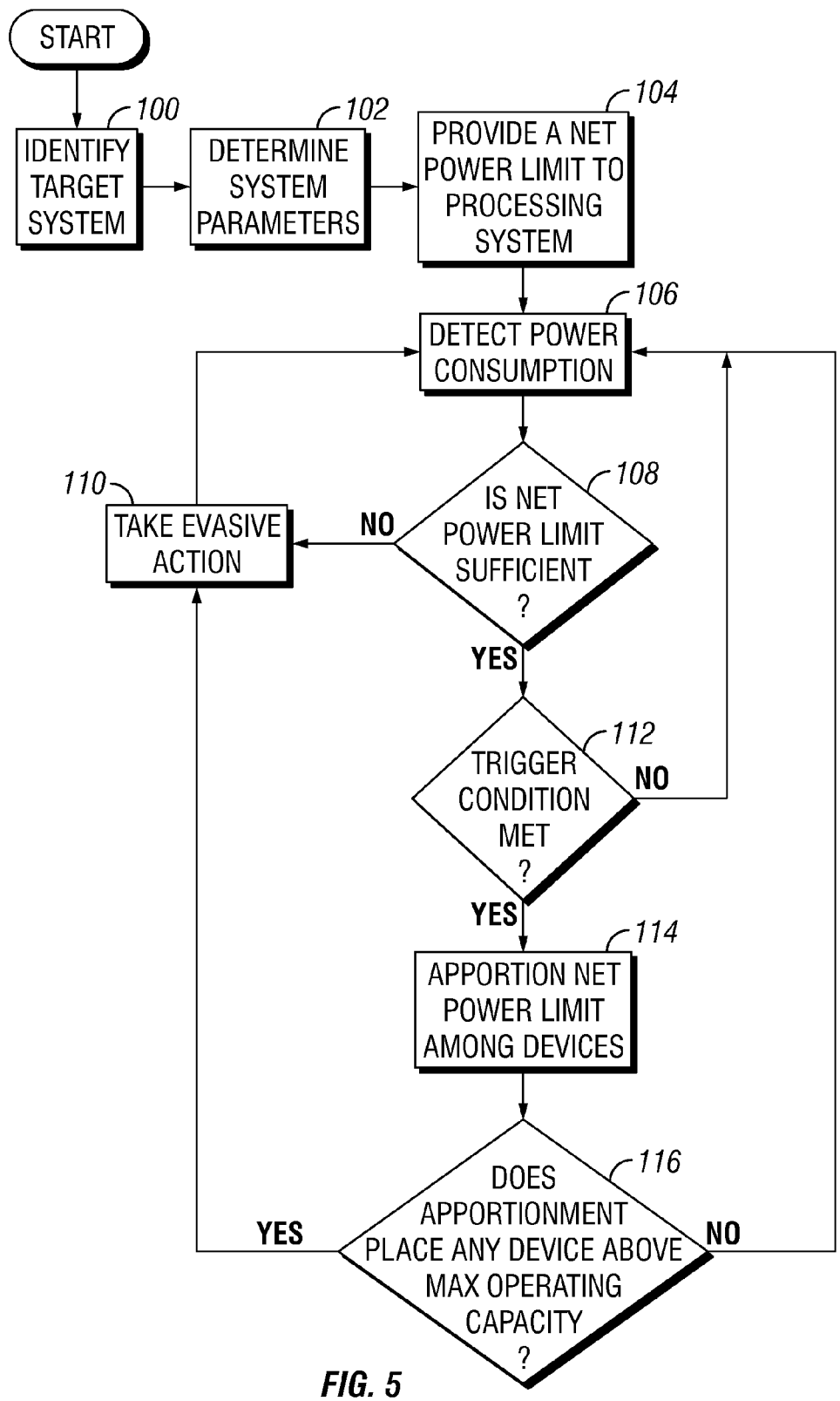
FIG. 5 is a flowchart outlining a method of managing power in a computer system according to the invention.

FIG. 5 is a flowchart outlining a method of managing power in a computer system according to the invention. In step 100 a target system is identified. One example of a target system is a rack-based server system having multiple server blades. Another example of a target system is an entire data center, wherein each "device" to be managed may include an entire rack of server blades. Other examples of power-managed target system will be apparent to one skilled in the art in view of this disclosure.

Once the target system has been identified, various system parameters may be determined in step 102. Examples of relevant system parameters include the power rating of a shared power supply used to power the devices, the maximum power capacity of each device, the maximum safe operating temperature of the target system or of the devices individually, limitations on the cost of operating the target system, and sound level restrictions imposed by a standards body.

A net power limit provided for the target system in step 104 may be selected by the power management module or by a user. The net power limit may be determined, in part, according to the system parameters identified in step 102. For example, the net power limit may be selected to limit the operating temperature, sound level, and cost of operating the target system or its devices. Alternatively, the net power may be limited by the maximum available power of the power supplies used to power the target system. The power consumption of the devices in the target system is detected and monitored in step 106.

An overriding consideration when managing power in the target system is whether the net power limit is sufficient to power the target system. Therefore, conditional step 108 determines whether the net power limit is ample to provide a desired overhead to all of the devices based on their power consumption detected in step 106. If sufficient power is not available to provide the desired overhead, then evasive action may be taken in step 110. Evasive action broadly encompasses any of a number of actions that may be used to avoid problems such as system or component failure, loss of data, inadvertent halting or improper shutting down of devices, and so forth. The evasive action will typically encompass temporarily reducing the net power limit and apportioning the reduced net power limit among the devices accordingly. This may impose a negative overhead as compared to the amount of power the servers would normally want to consume based on their loading. However, the local controllers provided to each server will enforce the reduced overhead on the servers, ensuring the systems would all continue to operate normally, albeit at some reduced performance due to clock throttling, DVFS, or some other power saving technique used to satisfy the reduced power budget. In rare instances, evasive action may optionally include properly shutting down the target system or a device or subsystem thereof. The system administrator may also be alerted of a potential fault so that corrective action may be taken.

Assuming the net power limit is sufficient according to conditional step 108, the target system may be monitored for a "trigger condition" in step 112 for triggering apportionment of the net power limit in the target system in step 114. Typically, the trigger condition is the passage of a selected time interval. The net power limit may be dynamically apportioned at regular intervals, to ensure continued operation of the devices within each of their apportioned power limits. Depending on the system, a time interval may be between as short as a single millisecond and as long as about two seconds. Alternative trigger conditions may be selected for a system according to the desired power margins on one or more of the devices.

Typically, the management module will determine which device(s) have excess allocated power, and the associated local controllers (at the direction of the MM) would reclaim an excess portion of the allocated power before that power is redistributing among the devices. In other embodiments, however, power may be reclaimed from the device(s) having excess power and substantially simultaneously redistributed among the devices with a sufficient degree of reliability not to exceed the net power limit at any instant.

The limitations of the target system and its devices may affect how power is apportioned in the target system. Conditional step 116 takes into account the power consumption of the devices and the apportionment of power, to determine when the desired power limit apportioned to any of the devices would exceed the maximum operating capacity. If the desired apportionment does exceed the physical parameters of any of the devices, then evasive action may be taken as broadly indicated in step 110. As in the case of insufficient overhead (conditional step 108), the evasive action taken is typically to lower the net power limit generally and/or individually reduce the overhead on each device. This may be a short-term response to the situation, followed by shutting down one or more of the devices in a manner that does not cause a running application to fail. Fortunately, no catastrophic problems are likely to occur unless power consumption of the system had reached a "line feed limit," which is unlikely on responsibly managed systems. For example, a serious problem could occur if a line feed had a 24 kWatt limit and two blade centers had their power supplies hooked up to the common line feed. If the power consumption of all the servers in the two blade centers exceeded the 24 kWatt line feed limit, the circuit breaker on that line feed would pop, and all the servers would immediately crash.

It should be recognized that the invention may take the form of an embodiment containing hardware and/or software elements. Non-limiting examples of software include firmware, resident software, and microcode. More generally, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and DVD.

A data processing system suitable for storing and/or executing program code typically includes at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output (I/O) devices such as keyboards, displays, or pointing devices can be coupled to the system, either directly or through intervening I/O controllers. Network adapters may also be used to allow the data processing system to couple to other data processing systems or remote printers or storage devices, such as through intervening private or public networks. Modems, cable modems, Ethernet cards, and wireless network adapters are examples of network adapters.

Figure 6:
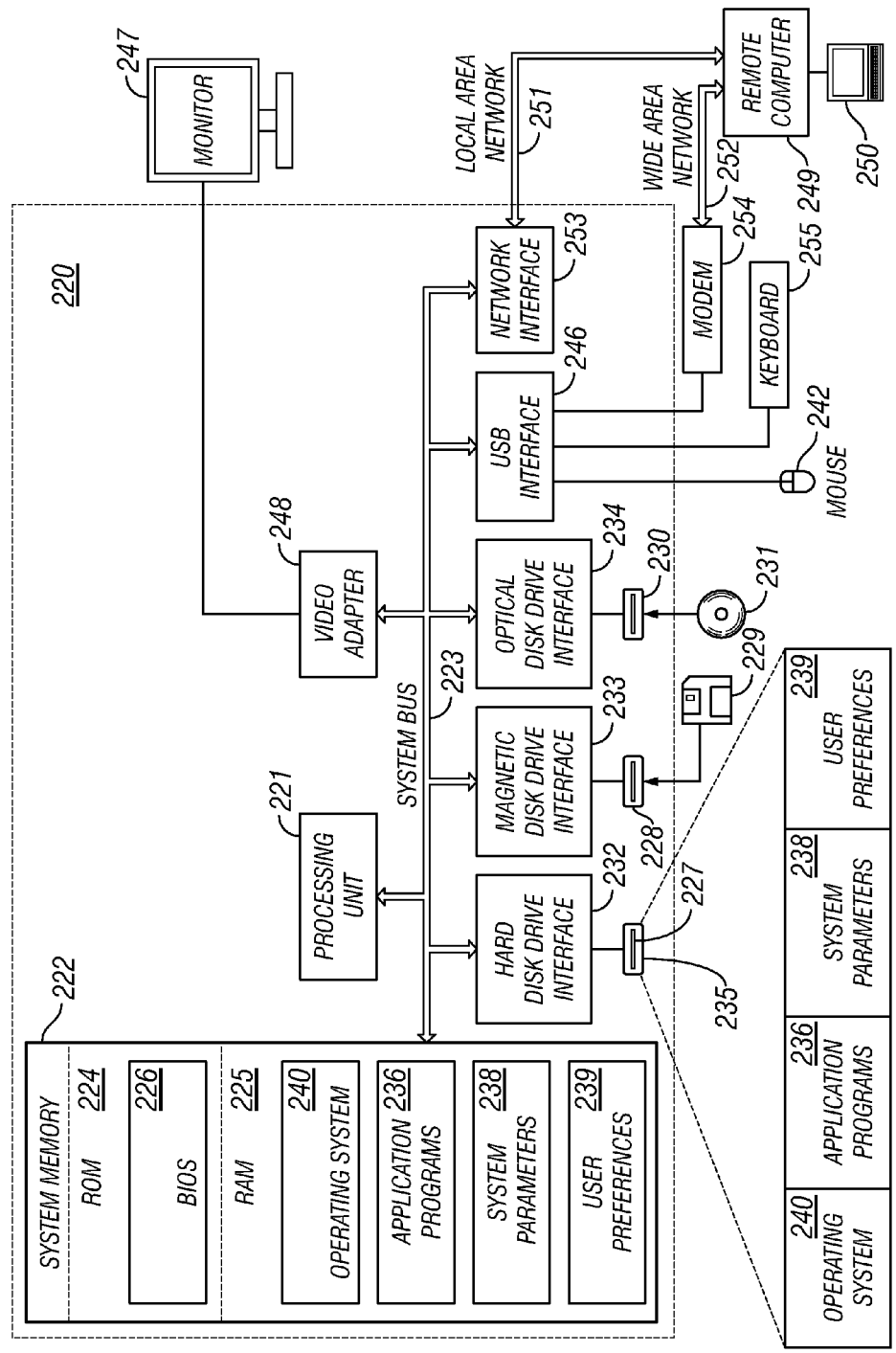
FIG. 6 is a schematic diagram of a computer system that may be configured for managing power in a target system of devices according to the invention.

FIG. 6 is a schematic diagram of a computer system generally indicated at 220 that may be configured for managing power in a target system of devices according to the invention. The computer system 220 may be a general-purpose computing device in the form of a conventional computer system 220. The computer system 220 may, itself, include the target system for which power is to be managed. Alternatively, the computer system 220 may be external to the target system. Generally, computer system 220 includes a processing unit 221, a system memory 222, and a system bus 223 that couples various system devices, including the system memory 222 to processing unit 221. System bus 223 may be any of several types of bus structures including a memory bus or memory controller, a peripheral bus, and a local bus using any of a variety of bus architectures. The system memory includes a read only memory (ROM) 224 and random access memory (RAM) 225. A basic input/output system (BIOS) 226 is stored in ROM 224, containing the basic routines that help to transfer information between elements within computer system 220, such as during start-up.

Computer system 220 further includes a hard disk drive 235 for reading from and writing to a hard disk 227, a magnetic disk drive 228 for reading from or writing to a removable magnetic disk 229, and an optical disk drive 230 for reading from or writing to a removable optical disk 231 such as a CD-R, CD-RW, DV-R, or DV-RW. Hard disk drive 235, magnetic disk drive 228, and optical disk drive 230 are connected to system bus 223 by a hard disk drive interface 232, a magnetic disk drive interface 233, and an optical disk drive interface 234, respectively. Although the exemplary environment described herein employs hard disk 227, removable magnetic disk 229, and removable optical disk 231, it should be appreciated by those skilled in the art that other types of computer readable media which can store data that is accessible by a computer, such as magnetic cassettes, flash memory cards, digital video disks, Bernoulli cartridges, RAMs, ROMs, USB Drives, and the like, may also be used in the exemplary operating environment. The drives and their associated computer readable media provide nonvolatile storage of computer-executable instructions, data structures, program modules, and other data for computer system 220. For example, the operating system 240 and application programs 236 may be stored in the RAM 225 and/or hard disk 227 of the computer system 220.

A user may enter commands and information into computer system 220 through input devices, such as a keyboard 255 and a mouse 242. Other input devices (not shown) may include a microphone, joystick, game pad, touch pad, satellite dish, scanner, or the like. These and other input devices are often connected to processing unit 222 through a USB (universal serial bus) 246 that is coupled to the system bus 223, but may be connected by other interfaces, such as a serial port interface, a parallel port, game port, or the like. A display device 247 may also be connected to system bus 223 via an interface, such as a video adapter 248. In addition to the monitor, personal computers typically include other peripheral output devices (not shown), such as speakers and printers.

The computer system 220 may operate in a networked environment using logical connections to one or more remote computers 249. each of the one or more remote computers 249 may be another personal computer, a server, a client, a router, a network PC, a peer device, a mainframe, a personal digital assistant, an internet-connected mobile telephone or other common network node. While a remote computer 249 typically includes many or all of the elements described above relative to the computer system 220, only a memory storage device 250 has been illustrated in FIG. 6. The logical connections depicted in the figure include a local area network (LAN) 251 and a wide area network (WAN) 252. Such networking environments are commonplace in offices, enterprise-wide computer networks, intranets, and the internet When used in a LAN networking environment, the computer system 220 is often connected to the local area network 251 through a network interface or adapter 253. When used in a WAN networking environment, the computer system 220 typically includes a modem 254 or other means for establishing high-speed communications over WAN 252, such as the internet Modem 254, which may be internal or external, is connected to system bus 223 via USB interface 246. In a networked environment, program modules depicted relative to computer system 220, or portions thereof, may be stored in the remote memory storage device 250. It will be appreciated that the network connections shown are exemplary and other means of establishing a communications link between the computers may be used.

Program modules may be stored on hard disk 227, optical disk 231, ROM 224, RAM 225, or even magnetic disk 229. The program modules may include portions of an operating system 240, application programs 236, or the like. A system parameter database 238 may be included, which may contain parameters of the computer system 220 and its many nodes and other devices, such as the devices of the target system, along with their maximum operating capacities, maximum operating temperatures, and so forth that may be relevant to the management of power in the target system. A user preferences database 239 may also be included, which may contain parameters and procedures for how to apportion power among various devices of the target system, including any trigger conditions that may be used to initiate re-apportionment of power. The user preferences database 239 may also include, for example, a user preference designating whether power is to be apportioned evenly among the devices.

Aspects of the present invention may be implemented in the form of an application program 236. Application program 236 may be informed by or otherwise associated with system parameter database 238 and/or user preference database 239. The application program 236 generally comprises computer-executable instructions for managing power in the target system according to the invention.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of managing power in a processing system, comprising:
   providing a net power limit to a plurality of devices within the processing system;
   detecting power consumption for each of the plurality of devices;
   dynamically apportioning the net power limit among the plurality of devices according to their detected power consumption to provide substantially equal power margins to the devices, wherein the power margin of each device is the difference between the apportioned power limit of the device and the power consumption of the device;
   communicating each apportioned power limit to an associated one of a plurality of local controllers each coupled to an associated one of the plurality of devices; and
   using each local controller to limit the amount of power to the associated device within the apportioned power limit of that local controller.

2. The method of claim 1, further comprising dynamically apportioning the net power limit at a selected time interval.

3. The method of claim 2, wherein the selected time interval is between about 1 ms and 2 s.

4. The method of claim 1, further comprising:
   selecting a minimum power margin for each device; and
   dynamically apportioning the net power limit to provide each device with at least its selected minimum power margin.

5. The method of claim 1, wherein the net power limit is less than a line feed limit.

6. The method of claim 1, further comprising selectively throttling one or both of a processor and a memory module included with the associated device.

7. A computer program product comprising computer usable program code embodied on a computer usable storage medium for managing power in a computer system, the computer program product including computer usable program code for:
   providing a net power limit to a plurality of devices within the processing system;
   detecting power consumption for each of the plurality of devices;
   dynamically apportioning the net power limit among the plurality of devices according to their detected power consumption to provide substantially equal power margins to the devices, wherein the power margin of each device is the difference between the apportioned power limit of the device and the power consumption of the device;
   communicating each apportioned power limit to an associated one of a plurality of local controllers each coupled to an associated one of the plurality of devices; and
   powering the associated device within its apportioned power limit.

8. The computer program product of claim 7, further comprising computer usable program code for dynamically apportioning the net power limit at a selected time interval.

9. The computer program product of claim 8, wherein the selected time interval is between about 1 ms and 2 s.

10. The computer program product of claim 7, further comprising:
    computer usable program code for selecting a minimum power margin for each device; and
    computer usable program code for dynamically apportioning the net power limit to provide each device with at least its selected minimum power margin.

11. The computer program product of claim 7, wherein the net power limit is less than a line feed limit.

12. The computer program product of claim 7, further comprising computer usable program code for selectively throttling one or both of a processor and a memory module included with the associated device.

13. A power-controlled processing system, comprising:
    a plurality of electronic devices;
    a shared power supply coupled to the devices for supplying power to the devices;
    a plurality of local controllers, each coupled to an associated one of the electronic devices for detecting power consumption of the associated device, outputting power consumption signals representative of the detected power consumption, and selectively controlling power to the associated device within an apportioned power limit; and a power management module in electronic communication with the plurality of local controllers for receiving the power consumption signals, apportioning a net power limit according to the detected power consumption to provide substantially equal power margins to the devices, wherein the power margin of each device is the difference between the apportioned power limit of the device and the power consumption of the device, and communicating each apportioned power limit to the local controller of the associated device.

14. The power-controlled processing system of claim 13, wherein each local controller comprises a service processor configured for selectively throttling one or both of a processor and a memory on the associated device.

15. The power-controlled processing system of claim 13, wherein the power management module is configured to apportion the net power limit at a selected time interval of between about 1 ms and 2 s.

16. The power-controlled processing system of claim 13, wherein the shared supply comprises one or more power supply modules.

17. The power-controlled processing system of claim 13, wherein the plurality of devices comprise a plurality of servers in a rack-based server system.

18. The power-controlled processing system of claim 13, wherein the power management module is configured to reduce the net power limit in response to a net power consumption exceeding the net power limit or in response to a power margin of one or more of the devices being less than a predetermined minimum power margin.

* * * * *